(12) United States Patent
Shoup

(10) Patent No.: US 6,776,107 B1
(45) Date of Patent: Aug. 17, 2004

(54) ROTARY ROW CLEANER FOR PLANTER

(76) Inventor: Kenneth E. Shoup, 17649 Richmond, Plainfield, IL (US) 60544

( * ) Notice: Subject to any disclaimer, the term of this patent is extended or adjusted under 35 U.S.C. 154(b) by 0 days.

(21) Appl. No.: 10/404,486

(22) Filed: Mar. 31, 2003

(51) Int. Cl.[7] ............................................... A01B 49/04
(52) U.S. Cl. ...................................... 111/140; 111/164
(58) Field of Search ......................... 111/139–146, 149, 111/157–169

(56) References Cited

U.S. PATENT DOCUMENTS

| | | |
|---|---|---|
| 4,785,890 A | 11/1988 | Martin |
| 5,341,754 A | 8/1994 | Winterton |
| 5,461,995 A | 10/1995 | Winterton |

Primary Examiner—Christopher J. Novosad
(74) Attorney, Agent, or Firm—Emrich and Dithmar LLC

(57) ABSTRACT

Apparatus comprising a frame carried by an elongated and laterally extending bar and having mounted thereon a first pair of rotatable trash wheels and a second pair of rotatable trash wheels longitudinally spaced behind the first pair of rotatable trash wheels and forward of a furrow opener. The first pair of rotatable trash wheels is angularly disposed toward each other forming a first angle therebetween and staggered such that one rotatable trash wheel contacts soil forward of the other rotatable trash wheel. The second pair of rotatable trash wheels is angularly disposed toward each other forming a second angle therebetween greater than the first angle. The apparatus cuts and clears trash from minimally and untilled soil.

20 Claims, 4 Drawing Sheets

VIEW A-A
TILT OF FRONT WHEELS

VIEW A-A
TILT OF BACK WHEELS

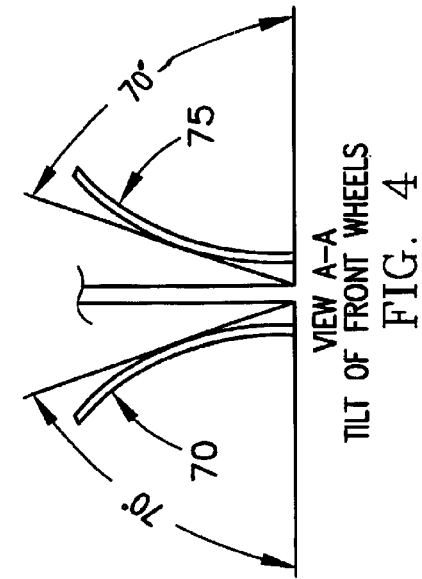
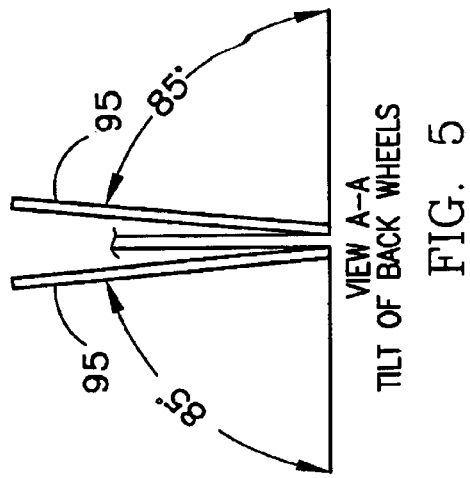
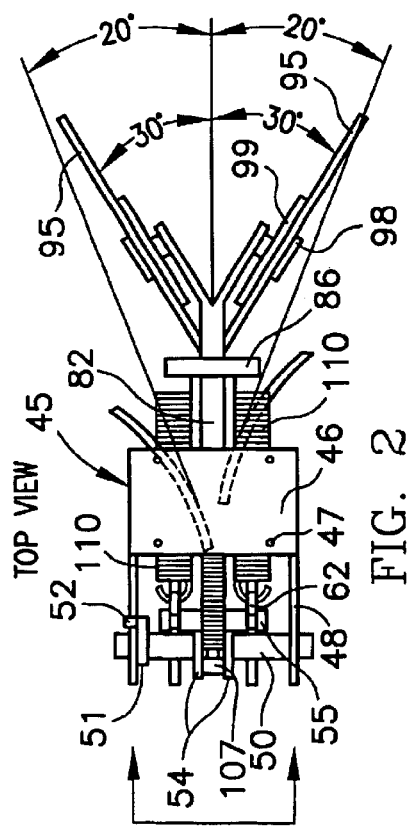
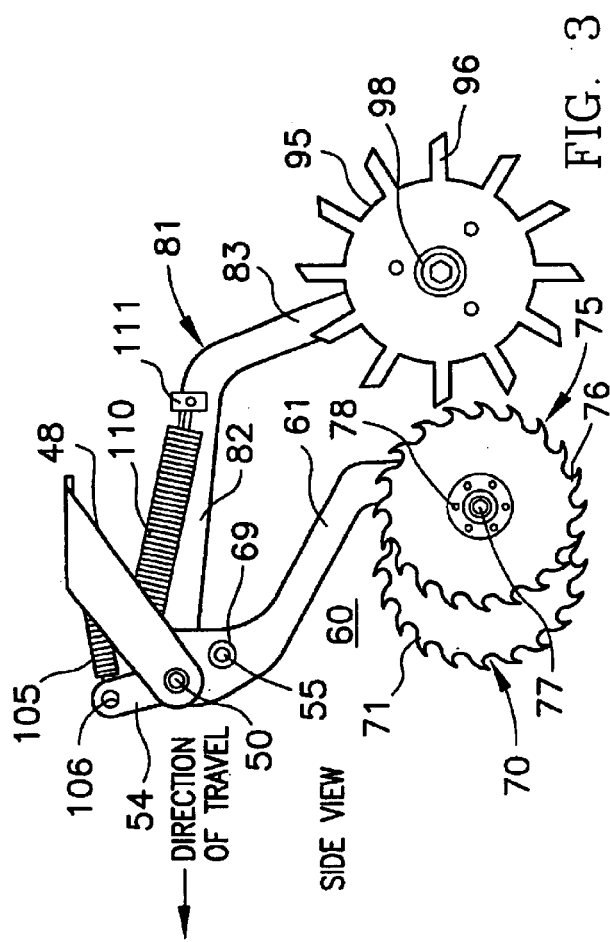

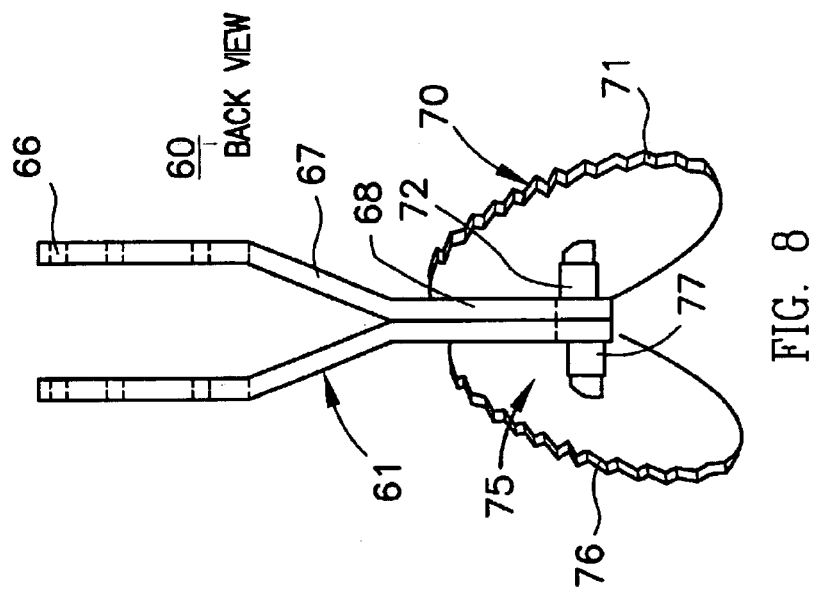
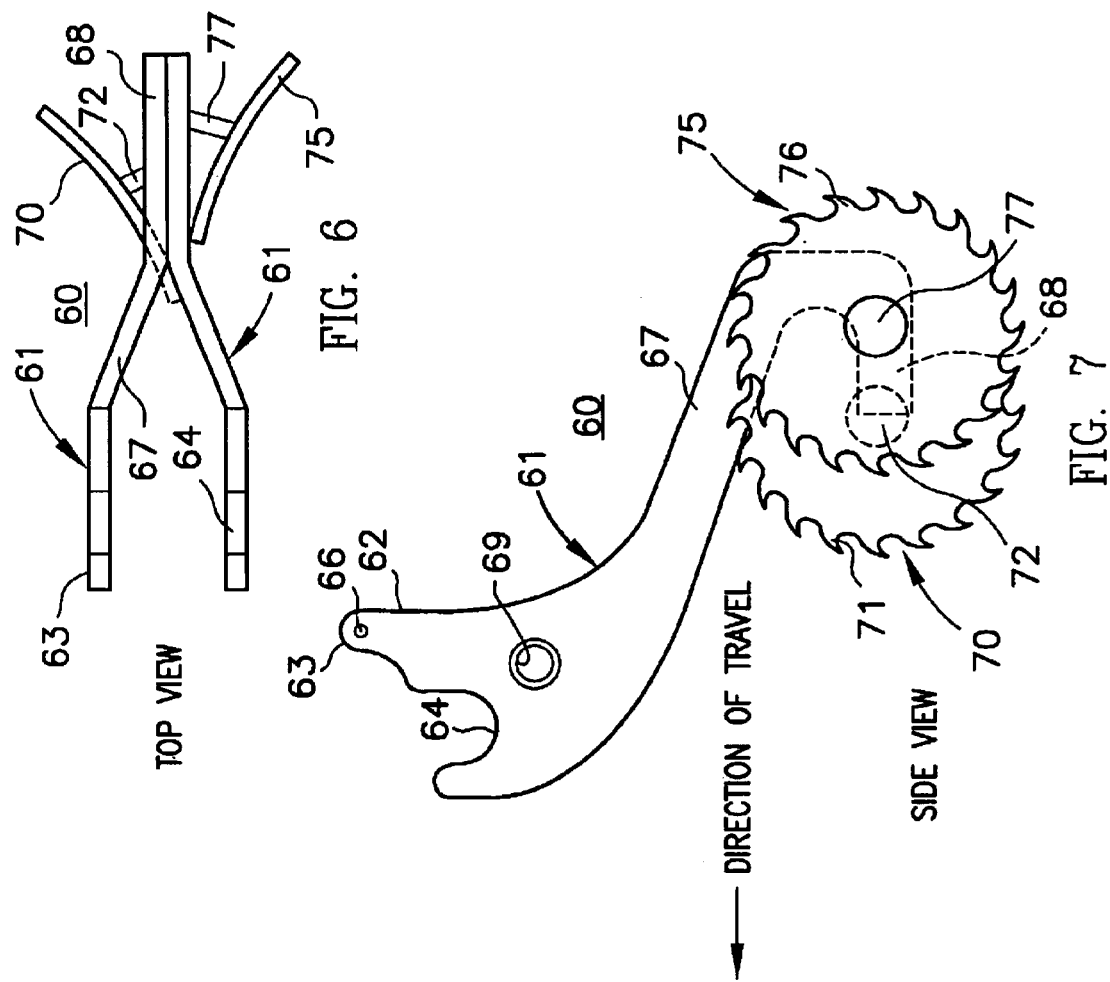

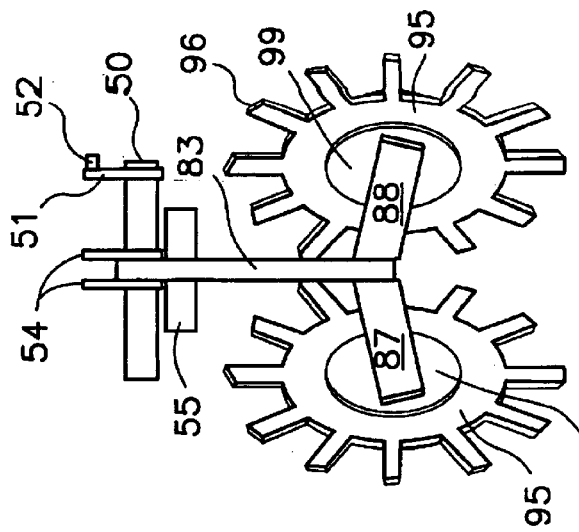
FIG. 11 BACK VIEW
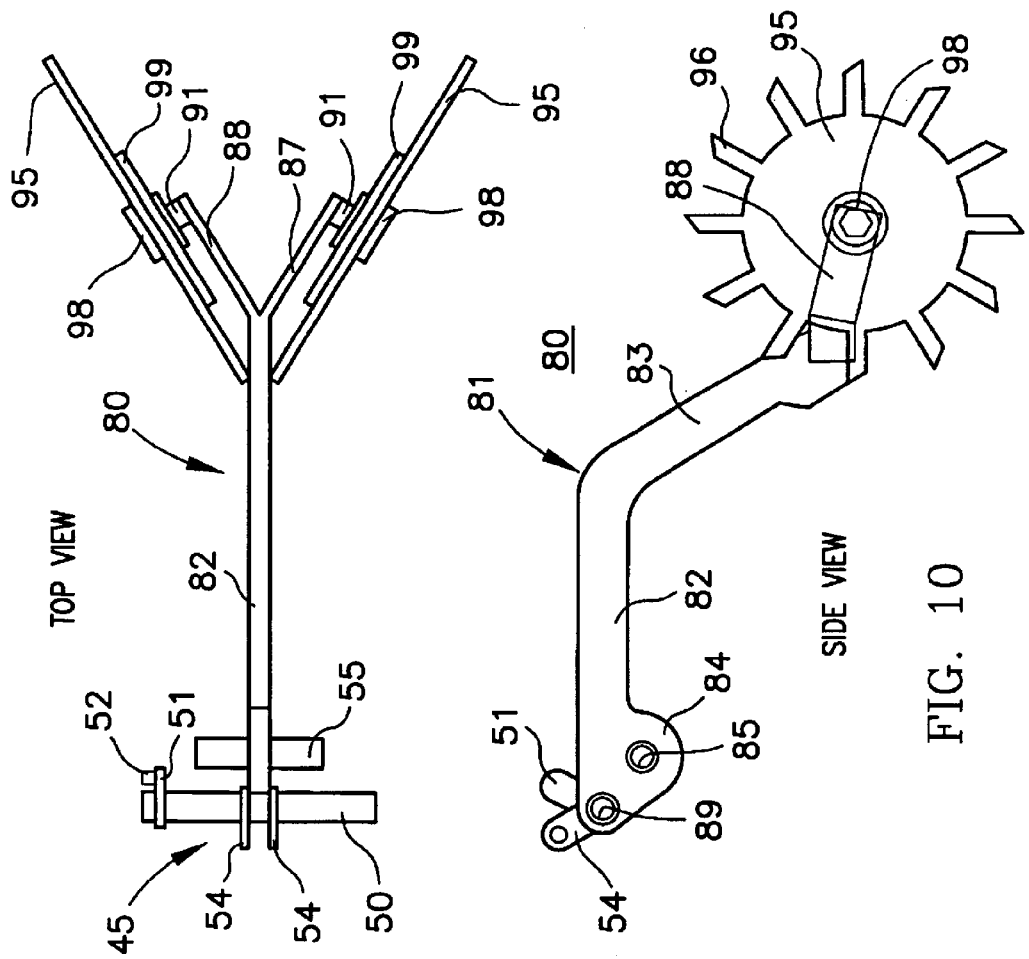
FIG. 9 TOP VIEW
FIG. 10 SIDE VIEW

ROTARY ROW CLEANER FOR PLANTER

BACKGROUND OF THE INVENTION

The present invention relates to a rotary, ground driven row cleaner for use in conservation tillage farming such as no-till or low-till and is particularly useful in conjunction with row planter units. Previous planter units using rotary row cleaner devices are illustrated in Martin U.S. Pat. No. 4,785,890, the Winterton U.S. Pat. 5,341,754 and the Winterton U.S. Pat. No. 5,461,995.

The row cleaners hereinbefore utilized consist generally of two toothed wheels which are angularly disposed so as to sweep residue, such as organic mulch, laterally away from the path followed by furrow opening means and frequently take the form of a pair of forwardly converging discs adapted to create a furrow in the soil. The toothed sweeper wheels traditionally are mounted on a rigid frame of the planter unit ahead of a pair of depth gauge wheels and are located at the position usually occupied by a rotatable coulter. When used, a coulter slices vertically into the soil ahead of the furrow openers and facilities formation of the furrow by the openers.

Various means have been suggested by which the sweeper wheels are urged toward or away from the ground and provided with adjustable mechanism, however, the previous devices have not provided a satisfactory answer to the trash buildup encountered in planting low-or no-till acreage.

SUMMARY OF THE INVENTION

Accordingly, it is an object of the present invention to provide apparatus which involves at least two pair of sweeper wheels with the forward-most pair acting as cutters while simultaneously moving the cut mulch or residue outwardly away from the associated furrow opening devices and another pair of wheels intermediate the first cutter pair and the furrow opening device further sweep residue or mulch away from the furrow opening devices.

Another object of the present invention is to independently spring the forward and rearward set of sweeper wheels so as to permit the sweeper wheels to cut mulch and other debris without unnecessarily disturbing the ground.

A further object of the present invention is to provide an apparatus for use with a planter unit having an elongated and laterally extending bar by which the planter unit is pulled forwardly and a furrow opener for use in minimally tilled or untilled soil, the apparatus comprising a frame carried by the elongated and laterally extending bar and having mounted thereon a first pair of rotatable trash wheels and a second pair of rotatable trash wheels longitudinally spaced behind said first pair of rotatable trash wheels and forward of the furrow opener, the first pair of rotatable trash wheels being angularly disposed toward each other forming a first angle therebetween and staggered such that one rotatable trash wheel contacts soil forward of the other rotatable trash wheel, the second pair of rotatable trash wheels being angularly disposed toward each other forming a second angle therebetween greater than the first angle, the first pair of rotatable trash wheels and the second pair of rotatable trash wheels each being positioned in engagement with soil with the centers of rotation of the rotatable trash wheels forming each pair on opposite sides of a vertical plane in the path of travel of the furrow opener whereby forward movement of the planter unit rotatably drives the first and second pair of rotatable trash wheels to cause the first pair of rotatable trash wheels to cut trash and to pull residue in laterally opposite directions and the second pair of rotatable trash wheels further pulling trash away from the path of the advancing furrow opener.

A final object of the present invention is to provide an apparatus for use with a planter unit having an elongated and laterally extending bar by which the planter unit is pulled forwardly and a furrow opener for use in minimally tilled or untilled soil, the apparatus comprising a frame mounted below the elongated and laterally extending bar and having a first pair of rotatable trash wheels mounted on a first shaft and a second pair of rotatable trash wheels mounted on a second shaft carried by the frame and longitudinally spaced behind the first pair of rotatable trash wheels and forward of the furrow opener, the first pair of rotatable trash wheels being angularly disposed toward each other forming a first angle therebetween and staggered such that one rotatable trash wheel contacts soil forward of the other rotatable trash wheel, the second pair of rotatable trash wheels being angularly disposed toward each other forming a second angle therebetween greater than the first angle, each of the first pair of rotatable trash wheels being angularly disposed to the ground and each of the second pair of rotatable trash wheels being angularly disposed to the ground at an angle greater than the corresponding angle formed by each of the first pair of rotatable trash wheels, each of the first pair of rotatable trash wheels and the second pair of trash wheels being independently and continually urged toward the soil, the first pair of rotatable trash wheels and the second pair of rotatable trash wheels each being positioned in engagement with soil with the centers of rotation of the rotatable trash wheels forming each pair on opposite sides of a vertical plane in the path of travel of the furrow opener whereby forward movement of the planter unit rotatably drives the first and second pair of rotatable trash wheels to cause the first pair of rotatable trash wheels to cut trash and to pull residue in laterally opposite directions and the second pair of rotatable trash wheels further pulling trash away from the path of the advancing furrow opener.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

FIG. 2 is a top view of the trash cleaning mechanism illustrated in FIG. 1;

FIG. 3 is a side elevational view of a portion of the mechanism seen in FIG. 1;

FIG. 4 is a front elevational view of the forward set of trash wheels;

FIG. 5 is a forward elevational view of the rear trash wheels;

FIG. 6 is a top view of the forward set of trash wheels;

FIG. 7 is a side elevational view of the forward set of trash wheels illustrated in FIG. 6;

FIG. 8 is a rear elevational view of the forward set of trash wheels illustrated in FIG. 6;

FIG. 9 is a top elevational view of the rear set of trash wheels;

FIG. 10 is a side elevational view of the rear set of trash wheels illustrated in FIG. 9; and FIG. 11 is a rear elevational view of the trash wheels illustrated in FIGS. 9 AND 10.

DETAILED DESCRIPTION OF THE INVENTION

Figure 1:
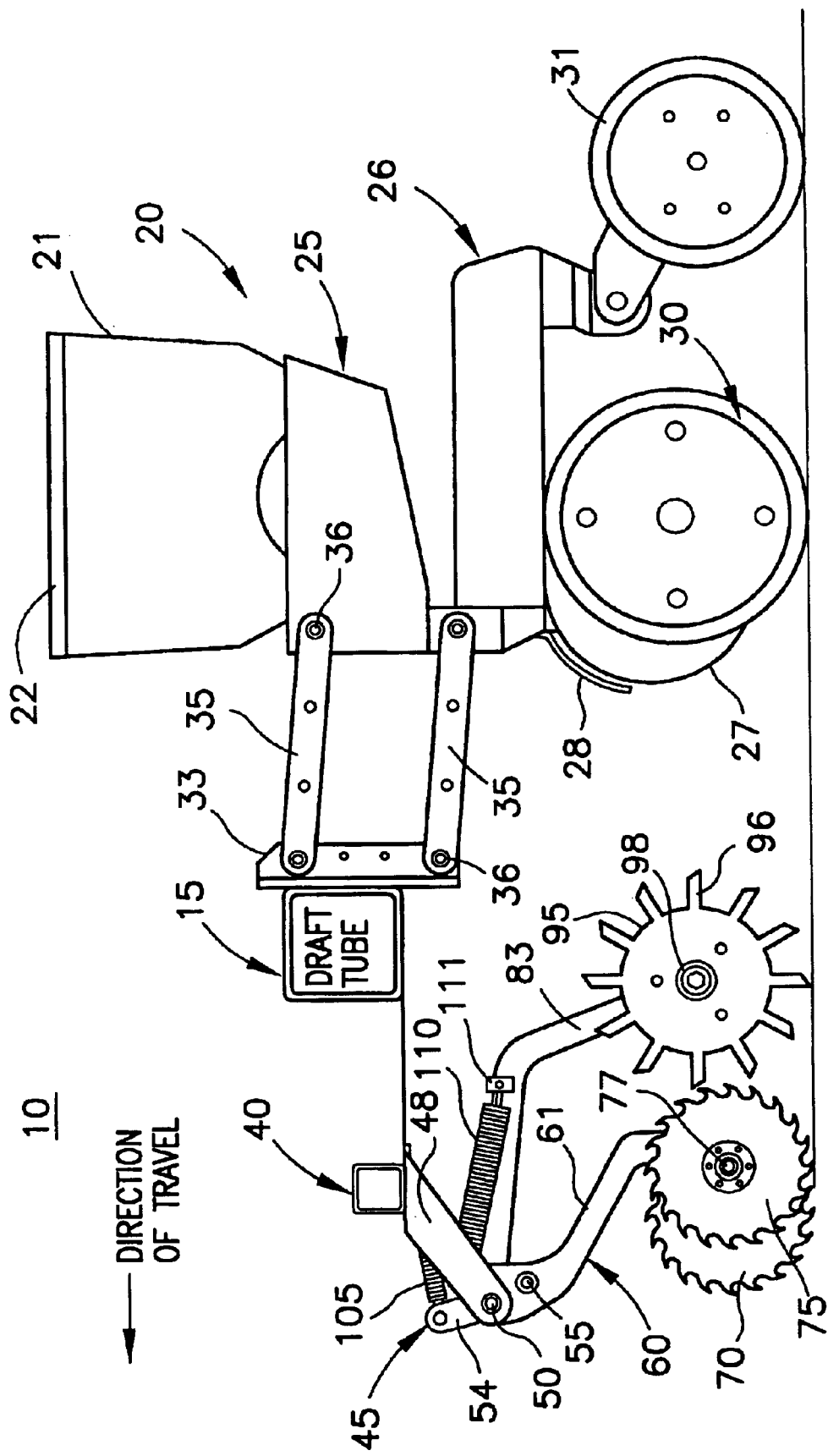
FIG. 1 is a side elevational view of a planter row unit having the trash cleaning mechanism of the present invention positioned forward of the row unit.

Referring now to FIGS. 1–3, there is shown a planter 10 which, as illustrated in FIG. 1, is in position to travel to the left pulled by a drive vehicle such as a tractor or the like. The planter 10 includes a elongated and laterally extending draft tube 15 to which are mounted a plurality of laterally spaced apart row units 20. The spacing between the row units 20 varies depending upon the crop being planted; however, the row unit 20 illustrated herein is representative of a row unit commonly used. Each row unit 20 includes a bin 21 which may contain seed, fertilizer, herbicide or the like and is closed with a cover 22. The bin 21 sits on an upper frame 25 which is connected to a lower frame 26 to which is attached a traditional opener 27, scrapers 28, gauge wheels 30 and closing mechanism 31, all as standard in the art. Each row unit 20 is connected to the draft tube 15 by means of a vertical mounting plate 33 which may be removably or fixable mounted to the draft tube 15 and connected to the row unit 20 by means of parallel linkage 35, each of the four links 35 being pivotally mounted as at 36 at both ends thereof.

Forwardly of the draft tube 15 is a smaller elongated and laterally extending bar or tube 40. The tubular bar 40 may be positioned slightly forward of the draft tube 15 or more, but is generally connected to the draft tube in a variety of ways. Connected to the tubular bar 40 for each row unit 20 is trash frame 45 which includes a generally flat plate 46 having mounting apertures 47 therein, and forwardly and downwardly extending arms 48 which are parallel and extend from the lateral ends of the top plate 46. A laterally extending shaft 50 passes through openings in each of the arms 48 and extends slightly there beyond. Connected to the shaft 50 is a stop arm 51 as particularly seen in FIGS. 2 and 9 having a stub shaft 52 thereon. In the center of the shaft 50 is an upward extending clevis 54 consisting of two spaced apart tabs each having an opening 106 therein for a purpose hereinafter described.

Referring now to FIGS. 1–8, there is disclosed a front trash wheel assembly 60 which includes spaced apart forward arms 61. As best seen in FIGS. 6 to 8, each arm has an upper portion 62, the inner surface of which is formed into a stop surface 63, for a purpose hereinafter set forth, and a U-shaped portion 64. As seen particularly in FIGS. 6–8, each of the upper portions 62 of the forward arms 61 has a small aperture 66 in the upper portion 62 thereof, also for a purpose hereinafter set forth, and an inwardly-extending portion 67 which joins the upper portion 62 to a forward extending portion 68 which is welded to the adjacent forward extending portion 68. Each of the forward arms 61 includes an aperture 69 through which is mounted a shaft 55 and around which the arms 61 rotate, all as will be described hereafter. The forward extending portion 68 of the two arms 61 may be welded together or may be formed from a single piece.

In use, a forward cutter wheel 70 is mounted on one of the arm portions 68 and is rotatable around a shaft 72, the cutter wheel 70 having teeth on the periphery thereof. A second cutting wheel 75 is mounted on a portion 68 of the other arm 61 rearward of the adjacent arm 61, the rear cutter wheel 75 being rotatably mounted on the shaft 77 and also being provided on the periphery thereof with teeth 76. The cutter wheels 70 and 75 are, therefore, staggered fore and aft and also angularly disposed with respect to the ground (see FIG. 4), as will be explained. Also, the cutter wheels 70, 75 are angularly disposed with respect to a longitudinal axis extending along the center line of the trash frame 45, which as seen in FIG. 2, illustrates that the forward trash cutter wheels 70 and 75 are angled 20° from a line extending perpendicularly to the longitudinal axis of the shafts 50 and 55. Each of the cutter wheels 70 and 75 may be dish shaped and disposed at the same 20 degree angle with respect to a line perpendicular to the longitudinal axis of shaft 50, and a line tangent to each of the dish-shaped cutter wheels 70, 75 or a 40 degree angle between the two wheels 70, 75. The arms 61, as seen in FIG. 6, are Y-shaped with wheels 70, 75 mounted on the stem of the Y and the diverging arms are mounted on the shaft 55.

Referring now to FIGS. 1–3 and FIGS. 9–11, there is illustrated a rear trash wheel assembly 80, the rear trash wheel assembly 80 including an arm 81 having a generally horizontal portion 82 and a downwardly angled portion 83. The horizontal portion 82 has a lobe 84 near the front thereof through which an aperture 85 extends. Another aperture 89 is positioned forwardly and upwardly of the aperture 85. As seen from FIG. 9, the horizontal portion 82 is a single piece of material, although it may be welded from a plurality of pieces and extends rearwardly until the angled portion 83 splits into the angularly spaced apart arms 87 and 88. Each of the arms 87 and 88 has extending therefrom a shaft 91 on which is mounted a rear wheel 95 having teeth 96 on the periphery thereof. The wheels 95 have an inner hub 99 and an outer hub 98 so as rotatably to mount the wheels 95 on the arms 87, 88. The arm 81 is also Y-shaped, but unlike the arms 61, the wheels 95 are mounted on the diverging portions 87, 88 and the stem 82 is mounted on the shaft 50.

As seen particularly in FIG. 2, the rear wheels 95 are angularly disposed 30 degrees from a line which perpendicularly intersects the shafts 50 and 55. Since both wheels 95 are angularly disposed in the same manner, a 60 degree angle exists between the two wheels 95. As illustrated in the drawing of FIG. 2, this 60° angle is a greater angle than the 40° angle formed by the forward cutter wheels 70 and 75. The rear wheels 95 are inclined toward the ground such that an 85 degree angle is formed between the adjacent ground and the plane formed by the wheel 95, see FIG. 5. On the other hand, the angle formed by the front cutter wheels 70, 75 with the adjacent ground is 70 degrees, as seen in FIG. 4. Therefore, the front cutter wheels 70 and 75 are closer to the ground or further from the vertical than the rear wheels 95, all for a purpose hereinafter set forth.

Finally, the rear arm 81, and more particularly the horizontal portion 82 thereof, has a bar 86 which extends transversely of the horizontal portion 82 and is firmly connected thereto, such as by welding. The bar 86 is located rearward of the trash frame 45 and preferably, but not necessarily, at approximately the meeting point of the two wheels 95, although the wheels 95 do not actually touch.

Accordingly, as may be seen, the rear trash wheel arm 81 with apertures 85 and 89 is mounted such that the shaft 50 carried by the trash frame arms 48 extends through the aperture 89 to rotatably mount the rear trash wheel assembly 80 thereon. The shaft 55 on which is mounted the forward trash wheel assembly 60 extends through the aperture 85 in the rear trash wheel arm 81 thereby pivoting both arms 61 on the shaft 55 carried by the rearward arm 81. A suitable mechanism is provided so that all shafts and wheels remain in place.

A center spring 105 is connected to a spring mounting shaft 107 extending between the arms of the clevis 54 each with the aperture 106 and is connected to the underside of the trash frame top plate 46. An adjustable mechanism such as a screw nut is used to provide adjustable tension to the spring 105. A pair of springs 110 extend between the aperture 66 on each of the front trash wheel arms 61 and a tab 111 on each side of the rear trash wheel arm 81 so as to provide tension to each of the front trash wheel arms 61.

Referring now principally to FIGS. 1–3, the operation of the planter 10 will be described. In minimum till or no till farming, a substantial amount of stubble or trash remains in the field prior to planting. With the apparatus of the present invention connected to the planter draft tube 15, as illustrated, the front trash wheel assembly 60 is pivotally mounted to the shaft 55 which extends through the aperture 85 in the rear trash wheel assembly 80 and is urged forward and toward the ground by the action of the springs 110 which pull the top of each arm 61 rearwardly thereby causing the forward trash wheels 70 and 75 to move forwardly and downwardly toward the ground. The extent of this continual urging is not so great as to cause the wheels 70 and 75 to bite into the ground, but is sufficient to cut the trash in the path of the planter 10.

As previously described, the front trash wheels 70 and 75 are not only staggered fore and aft as shown particularly in FIGS. 1–3 as well as FIGS. 6–8, but the front trash wheels 70 and 75 are also angled with respect to the ground as seen in FIG. 4. These two wheels 70, 75, therefore, provide substantial cutting action of any trash encountered and move the trash rearwardly and outwardly after it is cut along the angle formed by wheels 70, 75 with respect to a line perpendicular to the shaft 50. This angle being 20° for each wheel as illustrated in FIG. 2, or 40° between the wheels 70, 75. As the trash moves rearwardly, it encounters the rearward trash wheel assembly 80 and more particularly it encounters one of the wheels 95. Because the wheels 95 are at a greater angle with respect to a line perpendicular to the shaft 50 than the front wheels 70, 75; trash which is cut by the front wheels is moved further outwardly by contact with the wheels 95.

As seen, the wheels 95 are urged downwardly and toward the ground by the action of the adjustable spring 105 which is connected to the clevis 54. Because the spring 105 is adjustable, the tension of spring 105 can be adjusted not only to adjust the downward and forward movement of the rear trash assembly 80, but also the downward and front movement of the forward trash wheel assembly 60. It should be noted that shaft 50 is forward of shaft 55 thereby providing the spring action previously described. It is also seen that preferably, but not necessarily, the wheels 95 are somewhat larger than the forward wheels 70, 75 and the wheels 70, 75 carry substantially more teeth and sharper teeth on the periphery than do the wheels 95.

When the planter mechanism 10 is picked up at the end of the row in order to maneuver, the weight of the unit 20 along with the spring action will tend to move both pairs of wheels 70, 75 and 95 forwardly and downwardly. In order to limit this movement so as to preserve the springs and other mechanism, there are two stops provided. Stop mechanism 51 carrying the stub shaft 52 mounted on the shaft 50 contacts the forward extending frame arms 48 and thereby limits the rotational movement of the rear trash assembly 80. Likewise, the inner stop surface 63 on the upper portion 62 of each of the spaced apart arms 61 contacts the shaft 50 and prevents further rotational movement of the front wheel assembly 60 from rotating too far in the counter clockwise direction.

While particular embodiments of the present invention have been shown and described, it will be appreciated by those skilled in the art that changes, modifications and improvements may be made, for example in the processing of the materials or in the electrode and/or cell design without departing from the true spirit and scope of the invention.

I claim:

1. Apparatus for use with a planter unit having an elongated and laterally extending bar by which the planter unit is pulled forwardly and a furrow opener for use in minimally tilled or untilled soil, said apparatus comprising a frame carried by the elongated and laterally extending bar and having mounted thereon a first pair of rotatable trash wheels and a second pair of rotatable trash wheels longitudinally spaced behind said first pair of rotatable trash wheels and forward of the furrow opener, said first pair of rotatable trash wheels being angularly disposed toward each other forming a first angle therebetween and staggered such that one rotatable trash wheel contacts soil forward of the other rotatable trash wheel, said second pair of rotatable trash wheels being angularly disposed toward each other forming a second angle therebetween greater than said first angle, said first pair of rotatable trash wheels and said second pair of rotatable trash wheels each being positioned in engagement with soil with the centers of rotation of the rotatable trash wheels forming each pair on opposite sides of a vertical plane in the path of travel of the furrow opener whereby forward movement of the planter unit rotatably drives said first and second pair of rotatable trash wheels to cause the first pair of rotatable trash wheels to cut trash and to pull residue in laterally opposite directions and said second pair of rotatable trash wheels further pulling trash away from the path of the advancing furrow opener.

2. The apparatus of claim 1, wherein said first pair of rotatable trash wheels is mounted to a first shaft and said second pair of rotatable trash wheels is mounted to a second shaft carried by said frame.

3. The apparatus of claim 2, wherein spring mechanism extends between said frame and said second pair of rotatable trash wheels to urge said second pair of rotatable trash wheels forward and toward the ground.

4. The apparatus of claim 3, wherein said second pair of rotatable trash wheels is larger in diameter than said first pair of rotatable trash wheels.

5. The apparatus of claim 3 wherein each of said first pair of rotatable trash wheels is dish shaped having teeth on the periphery thereof to cut trash.

6. The apparatus of claim 5, wherein each of said dish shaped wheels and each of said second pair of rotatable trash wheels form an angle with the ground, the angle formed by each said dish shaped wheels and the adjacent ground is less than the angle formed by each of said second pair of rotatable trash wheels and the adjacent ground.

7. The apparatus of claim 5, wherein each of said second pair of trash wheels has teeth on the periphery thereof.

8. The apparatus of claim 6, wherein each of said first pair of rotatable trash wheels is pivotally mounted on a first arm carried on said first shaft and each of said second pair of rotatable trash wheels is pivotally mounted on a second arm carried on said second shaft, said first and second arms being pivotable with respect to said frame and being continually urged toward the soil.

9. The apparatus of claim 8, wherein said first arm is Y-shaped with each of said first pair of trash wheels being mounted on the stem and the diverging members being mounted on said first shaft.

10. The apparatus of claim 9, wherein said second arm is Y-shaped with each of said second pair of trash wheels being mounted on one of the diverging members and the stem being mounted on said second shaft.

11. The apparatus of claim 10, wherein said first arm has a stop surface thereon to limit downward movement thereof with respect to said frame.

12. The apparatus of claim 11, wherein said second arm has a stop member thereon to limit downward movement thereof with respect to said frame.

13. The apparatus of claim 12 wherein said first shaft extends through said stem of said second arm and said second shaft is forward of said first shaft.

14. The apparatus of claim 13, and further including spring mechanism extending between said first pair of rotatable trash wheels and said second pair of trash wheels.

15. Apparatus for use with a planter unit having an elongated and laterally extending bar by which the planter unit is pulled forwardly and a furrow opener for use in minimally tilled or untilled soil, said apparatus comprising a frame mounted below the elongated and laterally extending bar and having a first pair of rotatable trash wheels mounted on a first shaft and a second pair of rotatable trash wheels mounted on a second shaft carried by said frame and longitudinally spaced behind said first pair of rotatable trash wheels and forward of the furrow opener, said first pair of rotatable trash wheels being angularly disposed toward each other forming a first angle therebetween and staggered such that one rotatable trash wheel contacts soil forward of the other rotatable trash wheel, said second pair of rotatable trash wheels being angularly disposed toward each other forming a second angle therebetween greater than said first angle, each of said first pair of rotatable trash wheels being angularly disposed to the ground and each of said second pair of rotatable trash wheels being angularly disposed to the ground at an angle greater than the corresponding angle formed by each of said first pair of rotatable trash wheels, each of said first pair of rotatable trash wheels and said second pair of trash wheels being independently and continually urged toward the soil, said first pair of rotatable trash wheels and said second pair of rotatable trash wheels each being positioned in engagement with soil with the centers of rotation of the rotatable trash wheels forming each pair on opposite sides of a vertical plane in the path of travel of the furrow opener whereby forward movement of the planter unit rotatably drives said first and second pair of rotatable trash wheels to cause the first pair of rotatable trash wheels to cut trash and to pull residue in laterally opposite directions and said second pair of rotatable trash wheels further pulling trash away from the path of the advancing furrow opener.

16. The apparatus of claim 15, wherein said second pair of rotatable trash wheels is larger in diameter than said first pair of rotatable trash wheels.

17. The apparatus of claim 15, wherein each of said first and second pair of rotatable trash wheels has teeth on the periphery thereof.

18. The apparatus of claim 17, wherein each of said first pair of rotatable trash wheel is pivotally mounted on a first arm carried on said first shaft and each of said second pair of rotatable trash wheels is pivotally mounted on a second arm carried on said second shaft, said first shaft extending through said second arm and said second shaft being carried by said frame, second arms being pivotable with respect to said frame and said first arms being pivotable with respect to said second arm and both said first and second arms being continually urged toward the soil.

19. The apparatus of claim 18, wherein said first arm is Y-shaped with each of said first pair of trash wheels being mounted on the stem and the diverging members being mounted on said first shaft, and said second arm is Y-shaped with each of said second pair of trash wheels being mounted on one of the diverging members and the stem being mounted on said second shaft.

20. The apparatus of claim 19, wherein said second pair of rotatable trash wheels is continually urged toward the soil by an adjustable spring.

* * * * *